// DEVICE FOR AUTOMATICALLY METERING AND DISPLAYING THE FOOTAGE OF DELIVERED FILM CONTAINED IN EACH OF A PLURALITY OF INTERCHANGEABLE MAGAZINES ADAPTED TO BE MOUNTED ON THE BODY OF A CINEMATOGRAPHIC CAMERA

BACKGROUND OF THE INVENTION

The present invention relates to a device for automatically metering and displaying the footage of delivered film contained in each of a plurality of interchangeable magazines adapted to be mounted on the body of a cinematographic camera.

16 mm cinematographic film cameras currently use interchangeable magazines which are used selectively for filming various sequences. Consequently, such cameras pose the problem of identifying the magazine during use and of knowing, each time a new magazine is mounted on the body of the camera, the length of film that it contains and which has already been used in the course of filming previous sequences.

SUMMARY OF THE INVENTION

It is an object of the present invention to solve this problem by particularly simple means for identifying the magazines and for displaying for footage of film already used in each of them.

To this end this device for automatically metering and displaying the footage of delivered film contained in each of a plurality of interchangeable magazines adapted to be mounted on the body of a cinematographic camera comprises, on each magazine, an assembly of coded identification marks peculiar to each magazine and, on the body of the camera, a device for reading and identifying the various assemblies of coded marks borne by the various magazines, a memory with a plurality of zones allocated respectively to the various magazines and permanently containing information relative to the footage of film consumed in each magazine, a microprocessor receiving signals coming from the device for identifying the magazines, as well as a metering pulse emitted by a pulse generator coupled to the motor driving the film and emitting a pulse for each image, and a display device connected to the microprocessor for indicating at any moment the footage of film delivered and contained in the magazine used.

BRIEF DESCRIPTION OF THE DRAWINGS

The invention will be more readily understood on reading the following description with reference to the accompanying drawings, in which.

DESCRIPTION OF THE PREFERRED EMBODIMENTS

Figure 1:
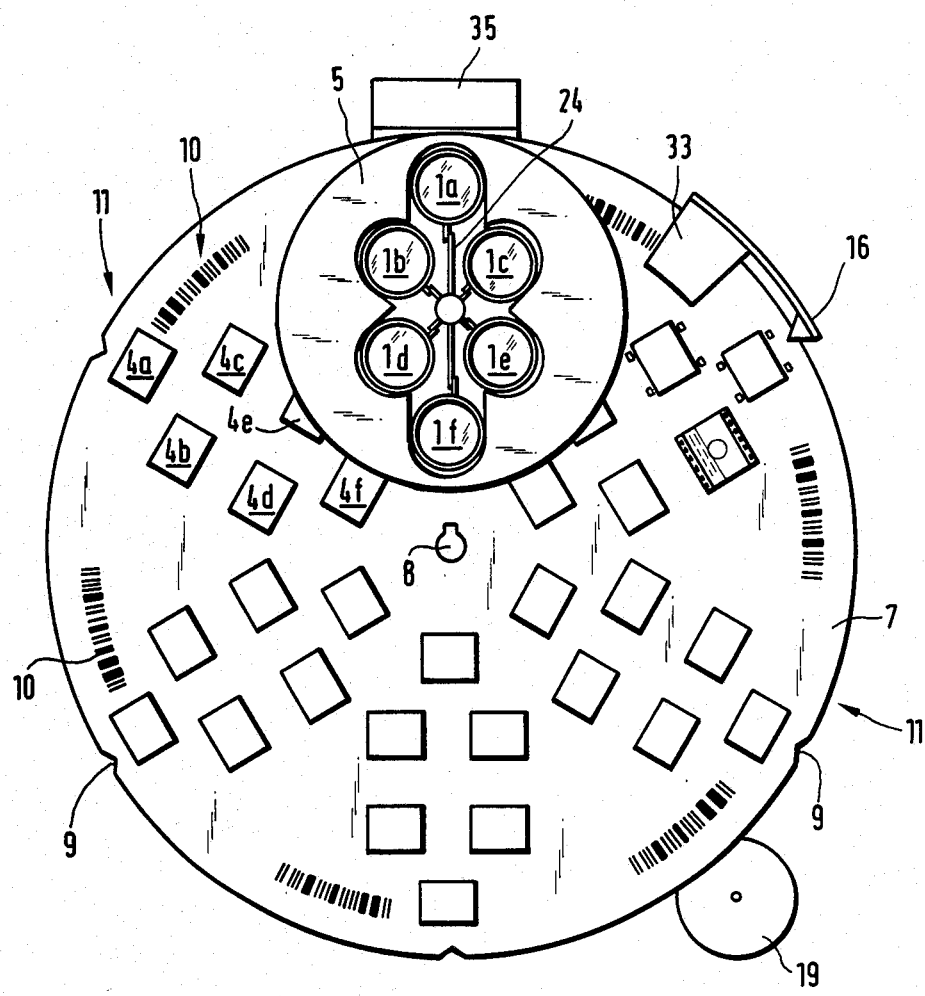
FIG. 1 is a block diagram a device for automatically metering and displaying the footage of delivered film contained in each of a plurality of interchangeable magazines adapted to be mounted on the body of a cinematographic camera.

Referring now to the drawings, the device according to the invention is incorporated in the body 1 of a cinematographic camera shown in chain-dotted lines in FIG. 1, and on which various interchangeable magazines 2, each containing a cinematographic film 3, may be adapted. In manner known per se, each magazine 2 contains a supply reel 4, a take-up reel 5, rollers 6,7 for guiding the film and sprocket capstans 8 driving the film and advancing it in front of a window 9 placed in front of the lens 11 of the camera, when the magazine is mounted on the body 1. The film is driven by means of an electric motor 12 housed in the body 1 of the camera.

According to the invention each magazine 2 bears, on one of its walls, an assembly of coded identification marks 13 which univocally identify the magazine in question. These marks 13 are advantageously constituted by magnets which are permanently fixed on the wall of the magazine or are removable. These marks 13 are disposed in a binary code. For example, if each identification assembly comprises three marks 13, respectively allocated to bits of weight 1,2 and 4, it is possible to identify, by means of the various combination of bits, seven magazines.

The body 1 of the camera contains, near the locations of the identification marks 13 of the magazine 2 when the latter is mounted on the body 1, a magazine identification device 14 which is preferably a device of the type without magnetic contact. This device consequently comprises, on the body 1 of the camera, three magneto-sensitive sensors 15, such as Hall probe sensors currently used in certain computer Reyboards, of flexible blade switches or reed relays. When a magazine 2 is mounted on the body 1 of the camera, each of the identification magnets 13 borne by the magazine 2 lies opposite a magneto-sensitive sensor 15 which is associated therewith. Consequently, the magazine identification device 14 emits at its output a train of binary signals of which the combination corresponds univocally to the magazine 2 mounted on the body 1 of the camera.

Figure 3:
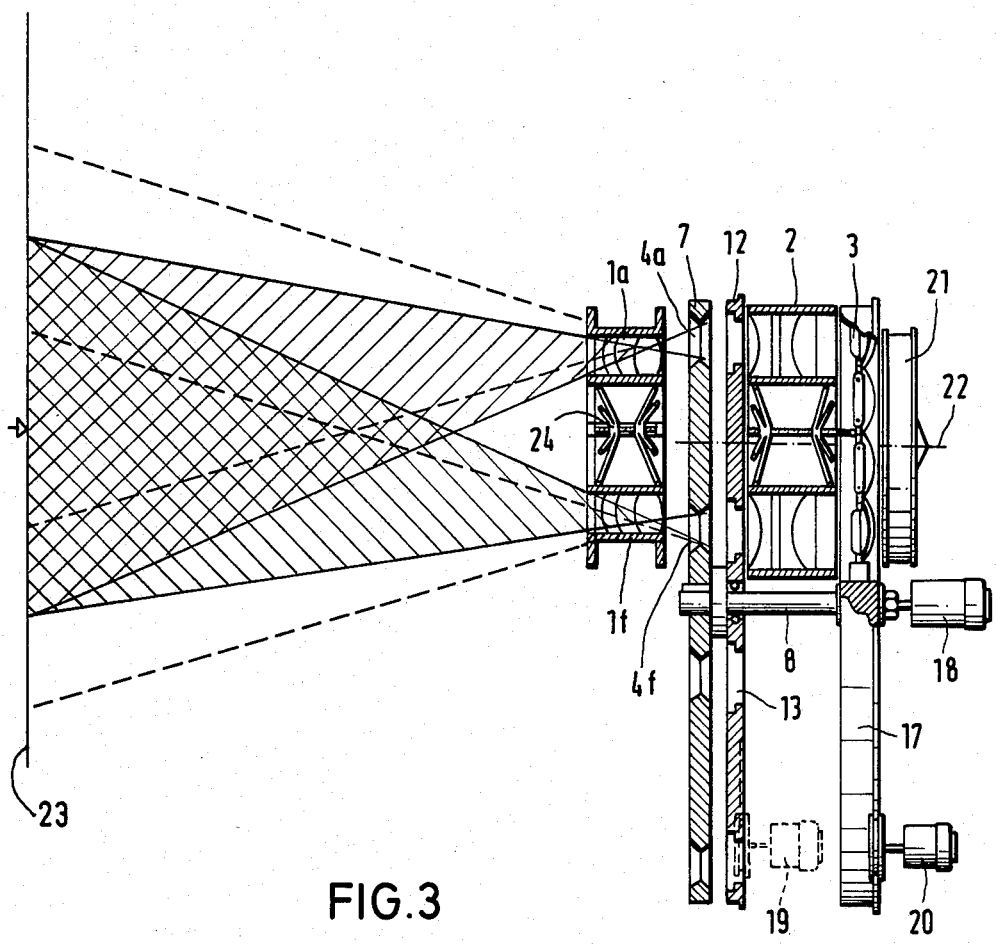
FIG. 3 is an electrical diagram the magazine identification device.

The electrical diagram of the identification device 14 may be such as the one illustrated in FIG. 3. The three magneto-sensitive sensors 15 are seen to be connected in parallel each of them in series with a respective resistor 16, between the terminals of a D.C. supply source. The output conductors 17 of the magazine identification device 14 are connected to the respective points of junction between the resistors 16 and the magneto-sensitive sensors 15. When no magazine 2 is mounted on the body of the camera 1, the three magneto-sensitive sensors are normally open, and three logic "1" signals are present on the three output conductors 17. On the contrary, when a magazine is engaged in the camera, the or each of the magnets 13 present on this magazine provokes the closure of one or more of the magneto-sensitive sensors, which brings about the appearance, on the or each corresponding output conductor 17, of a logic "0" signal (low level). Consequently, depending on the distribution (number and position) of the magnets 13 constituting the identification marks on each magazine 2, the magazine identification device 14 emits a particular assembly of signals "0" and "1", i.e. of logic levels.

Furthermore, the body 1 of the camera contains an electronic assembly constituted by a microprocessor 18, for exmple of the 8749 INTEL type, connected to a display device 19 and a memory 21 for safeguarding the information. This memory 21 is itself connected to a safeguard battery 22 which maintains a permanent supply of this memory, whatever the state of the camera.

The microprocessor 18 is also connected to a pulse generator 23 which is coupled to the motor 12 for driv-

United States Patent [19]

Sacher

[11] Patent Number: 4,627,696
[45] Date of Patent: Dec. 9, 1986

[54] PROJECTION APPARATUS

[76] Inventor: Friedrich-Josef Sacher, Agnesstrasse 52a, 5210 Troisdorf, Fed. Rep. of Germany

[21] Appl. No.: 638,471
[22] PCT Filed: Nov. 29, 1983
[86] PCT No.: PCT/EP83/00318
§ 371 Date: Jul. 26, 1984
§ 102(e) Date: Jul. 26, 1984
[87] PCT Pub. No.: WO84/02200
PCT Pub. Date: Jun. 7, 1984

[30] Foreign Application Priority Data

Dec. 1, 1982 [DE] Fed. Rep. of Germany ....... 3244394

[51] Int. Cl.[4] .................. G03B 23/10; G03B 23/16
[52] U.S. Cl. .................................................. 353/110
[58] Field of Search ................. 353/110, 108, 109, 19, 353/120, 94; 40/362, 366, 367

[56] References Cited

U.S. PATENT DOCUMENTS 3,036,496  5/1962  Frederick.
3,841,744  10/1974 Rubin ............................. 353/85 X

FOREIGN PATENT DOCUMENTS 141698   6/1951  Australia ............................. 353/94
761744   7/1929  Belgium.
527915   4/1954  Belgium ............................. 353/94
0032438  7/1981  European Pat. Off..
2243767  3/1974  Fed. Rep. of Germany ...... 353/110
1423058  11/1965 France.
2365140  4/1978  France.
523344   4/1955  Italy ..................................... 353/94
486716   4/1970  Switzerland.

Primary Examiner—Harry N. Haroian
Attorney, Agent, or Firm—Michael J. Striker

[57] ABSTRACT

A projection apparatus for transparencies has at least four projectors each including a projection lamp, a condensor and an objective and arranged to point at the same part of a picture screen. The projectors are offset from one another, the objectives and the condensors have axes which are transversely offset from one another so as to project on the picture screen pictures in register, the projection lamps are adjustable in their brightness independently of one another. A flat disc supports a plurality of transparencies with offset similar to the projectors and rotates about a central axis. The disc is subdivided into a plurality of substantially equal sectors each arranged for supporting a group of at least four transparencies to be associated with the four projectors. An objective support supports the objectives of the projectors with offset relative to one another; and a condensor support supports the condensors of the projectors with offset which is similar to the offset of the objectives. An elective drive drives the disc for supporting the transparencies.

18 Claims, 11 Drawing Figures

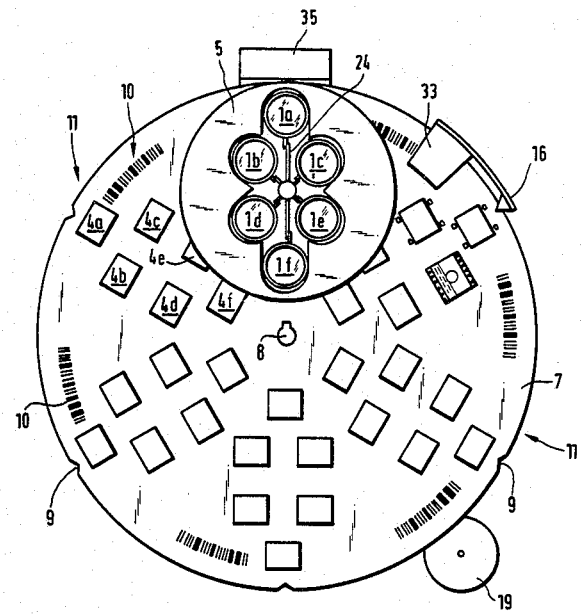

PROJECTION APPARATUS

The present invention is with respect to a projection apparatus for transparencies with at least two objectives, each of which has its own condensor and a projection lamp and furthermore a transparency that may be pushed into position between the condensor and the objective and the projection lamps may be controlled independently of each other. Projection apparatus of this sort is known and is used for producing so-called multivision programs with fading in and quick picture changes.

Known projection apparatus on these lines is very complex and has the shortcoming that it is hard to put the optical axes exactly into the desired position and to put the objectives in focus. Furthermore with such known projection apparatus there is a limit to the speed of changing the picture and to possible fading operations. In the known projection apparatus it is mainly a question of having a number of separate projectors with a roundabout or carussel magazine placed on top of each other or side by side in a frame and their optical systems are exactly pointed at the same part of the picture screen.

Although it is possible for known projection apparatus to be used for producing multivision displays and quick sequences of images, the lining up of the separate projectors forming parts of the projection apparatus is a very slow process. Because of the relatively large distances between the separate objectives of the projection apparatus the projected transparencies are not placed exactly in the right position in relation to each other, more specially at the edge parts, because the projectors are placed at different angles in relation to the picture screen. Seeing that furthermore the known projection apparatus has to have a separate transparency magazine for each of the projectors, and the transparancies of the magazine are moved automatically into the projector and taken therefrom, the known projection apparatus is very complex mechanically and different sorts of trouble conditions are likely therewith.

One purpose of the invention is that of designing a projection apparatus for multivision, in the case of which the shortcomings noted herein in connection with the known forms of apparatus are put an end to and the apparatus is of simple technical design and may be used for projecting in a rapid sequence a number of transparencies at the same time or one by one onto the same part of a picture screen. More importantly, a part of the purpose of the invention is designing a projection apparatus that is trouble-free even after being used for a long time and which may be used for projecting even the edge parts of pictures exactly and without distortion.

This purpose is effected in the invention by the system as defined in the characterizing part of claim 1.

In the projection apparatus in keeping with the present invention there is the useful effect that no time is needed for getting a number of different projectors ready for operation. The electronic control of the separate projection lamps may be made simpler, seeing that at one and the same time four to eight transparencies are ready for projection, and may be projected separately or with a fading effect by separate control or switching on of the different projection lamps. The placing of a number of transparencies in keeping with the invention on a transparency support gives the useful effect that the separate transparencies may be exactly lined up on the transparency support and may be rocked into place quite as exactly between the condensors and the objectives.

The projection apparatus in keeping with the present invention may be fitted with a translucent picture screen, that is placed at fixed, relatively small distance from the objectives. In this form of the invention the apparatus may be more specially be used in store windows, sales offices and the like where publicity material is projected.

The apparatus in keeping with the invention may however furthermore be used for projecting the transparencies onto a reflecting screen, in which case the distance between the screen placed in front of the projection apparatus may be adjusted.

Further developments and forms of the invention will be seen in the dependent claims.

A detailed account will now be given of working examples of the invention using the figures herein.

FIG. 1 is a front view of a projection apparatus with six objectives and a round transparency support with thirty six transparencies or slides.

Figure 2:
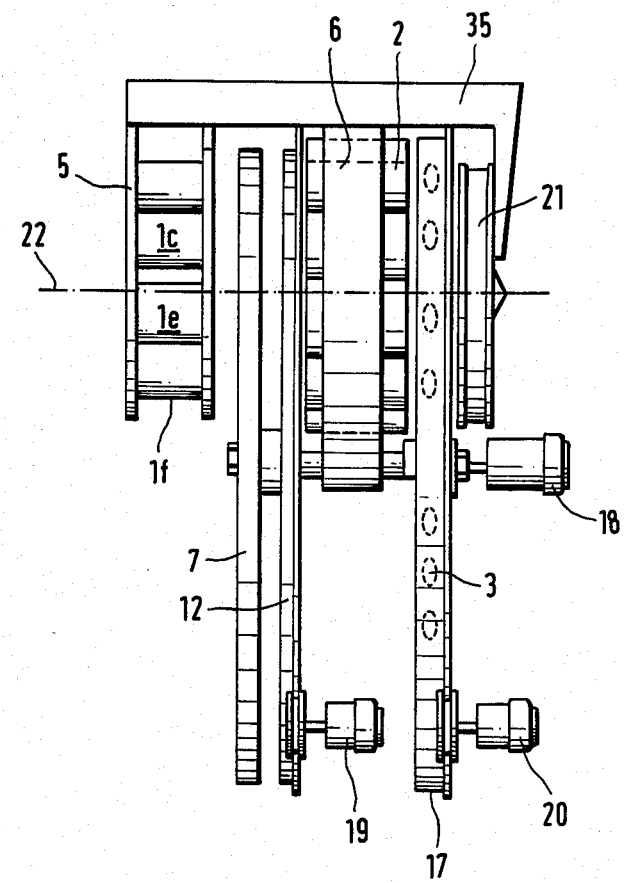
FIG. 2 is a perspective view of the magazine identification device.

FIG. 2 is a side view of the projection apparatus as in FIG. 1.

FIG. 3 is a section and view of the projection apparatus.

Figure 4:
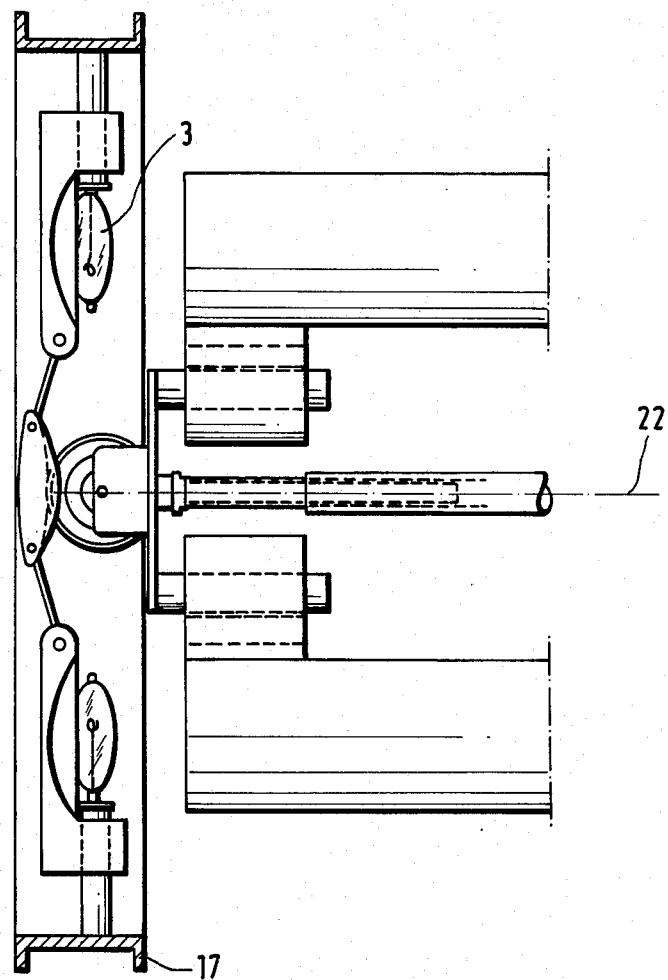

FIG. 4 is a section and view of the lamp support.

Figure 5:
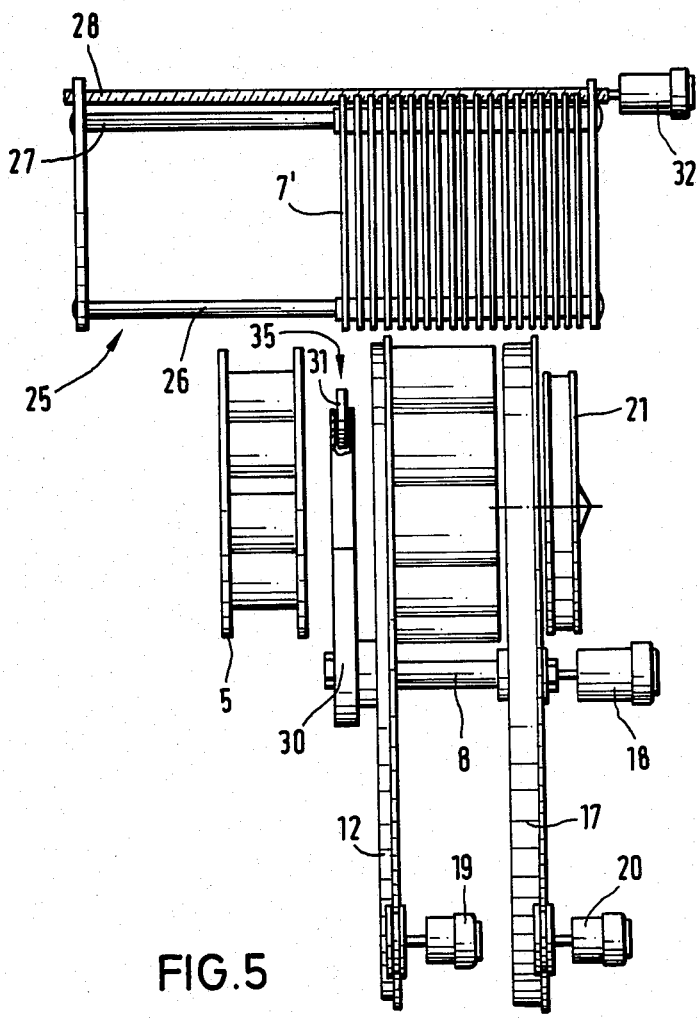

FIG. 5 is a side view of the projection apparatus in keeping with FIG. 2 with the disk magazine put in place thereon.

Figure 6:
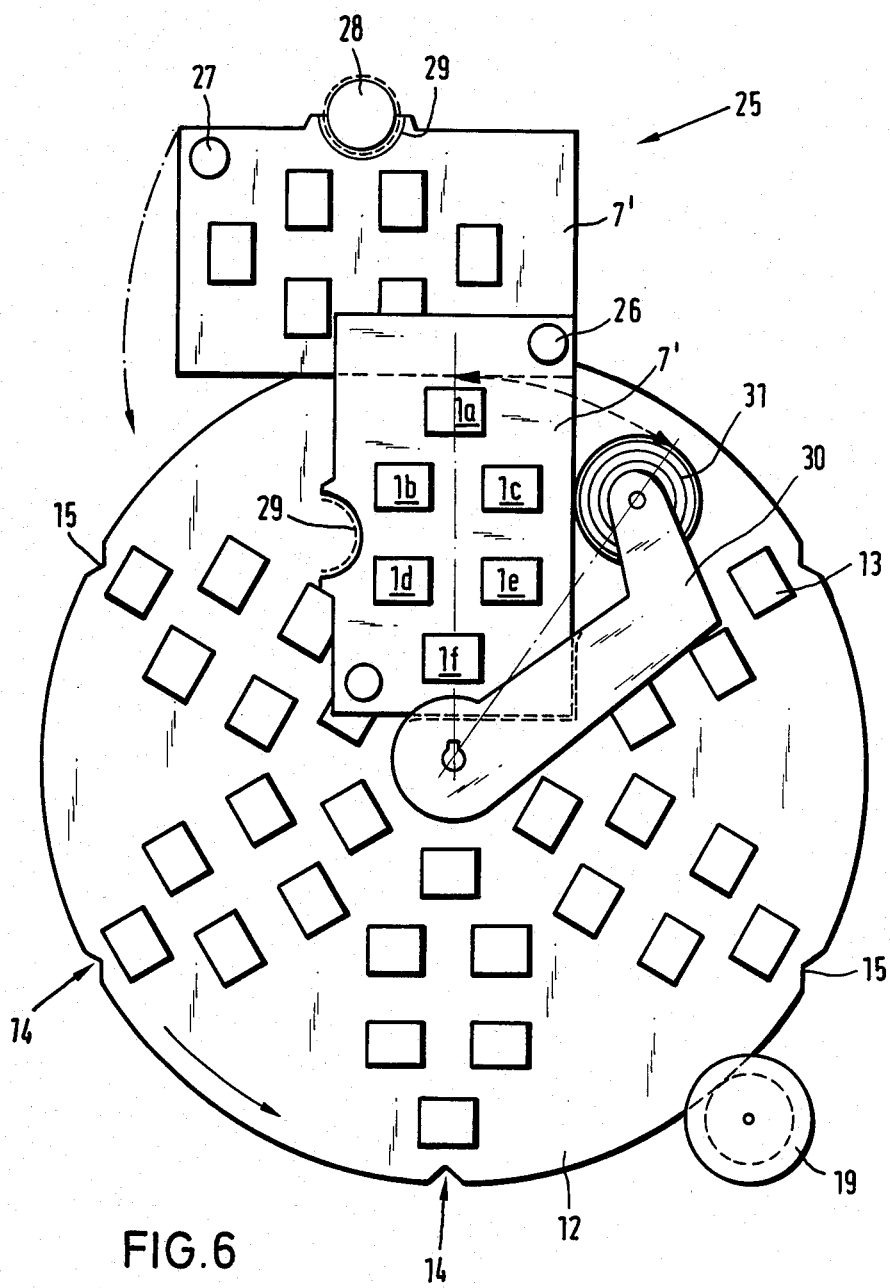

FIG. 6 is a front view of the disk magazine and a special effects disk.

Figure 7:
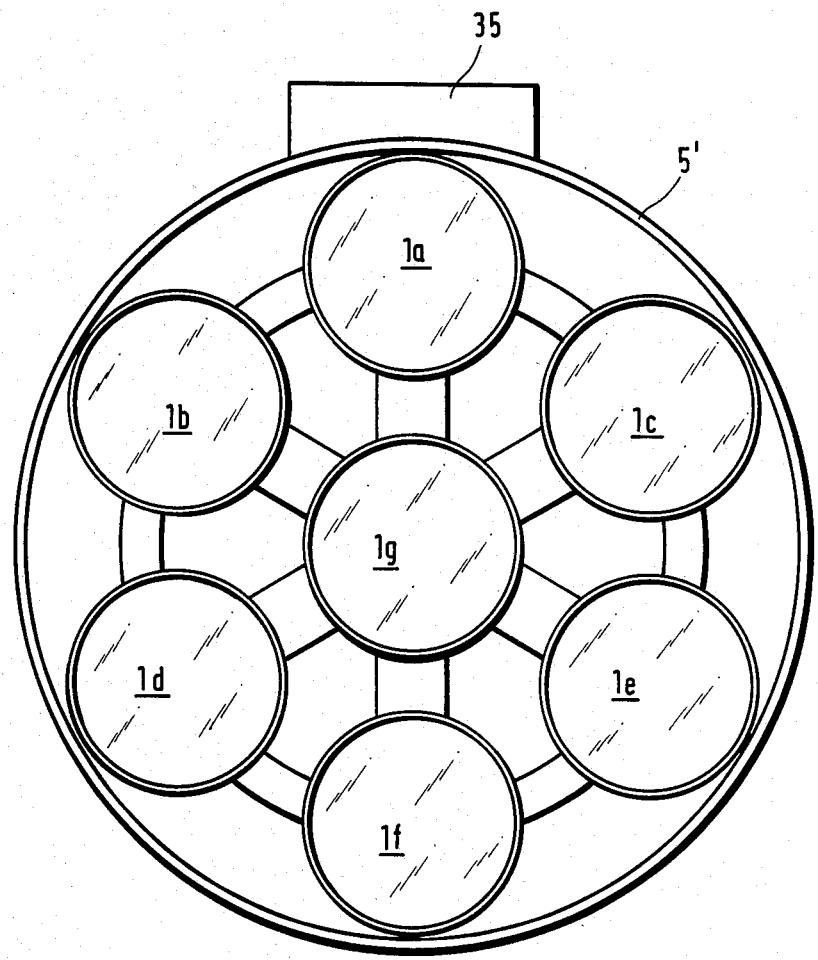

FIG. 7 is a front view of an objective support with seven objectives.

Figure 8:
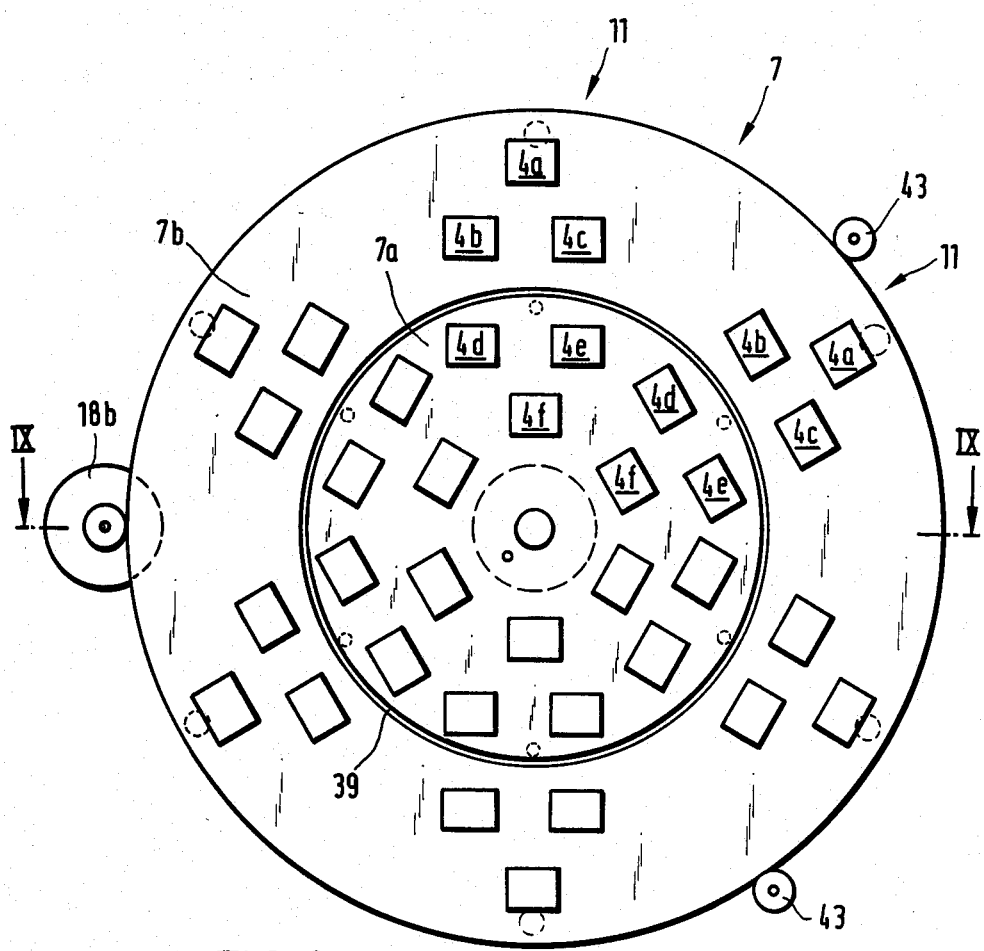

FIG. 8 is a front view of a split slide support.

Figure 9:
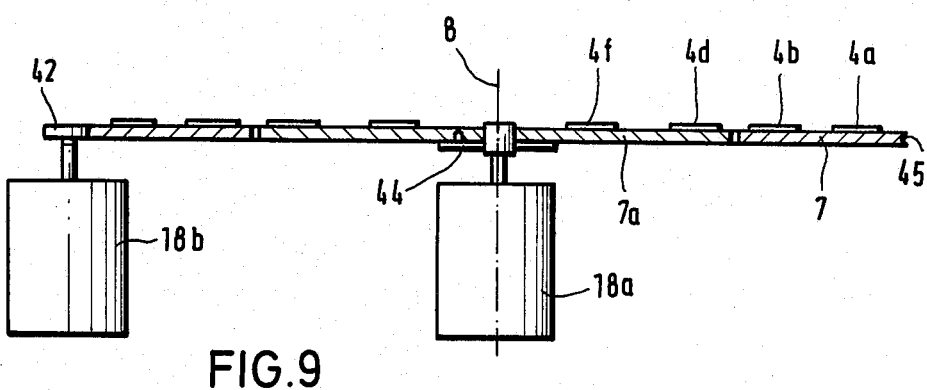

FIG. 9 is a view on the section line IX—IX of FIG. 8.

Figure 10:
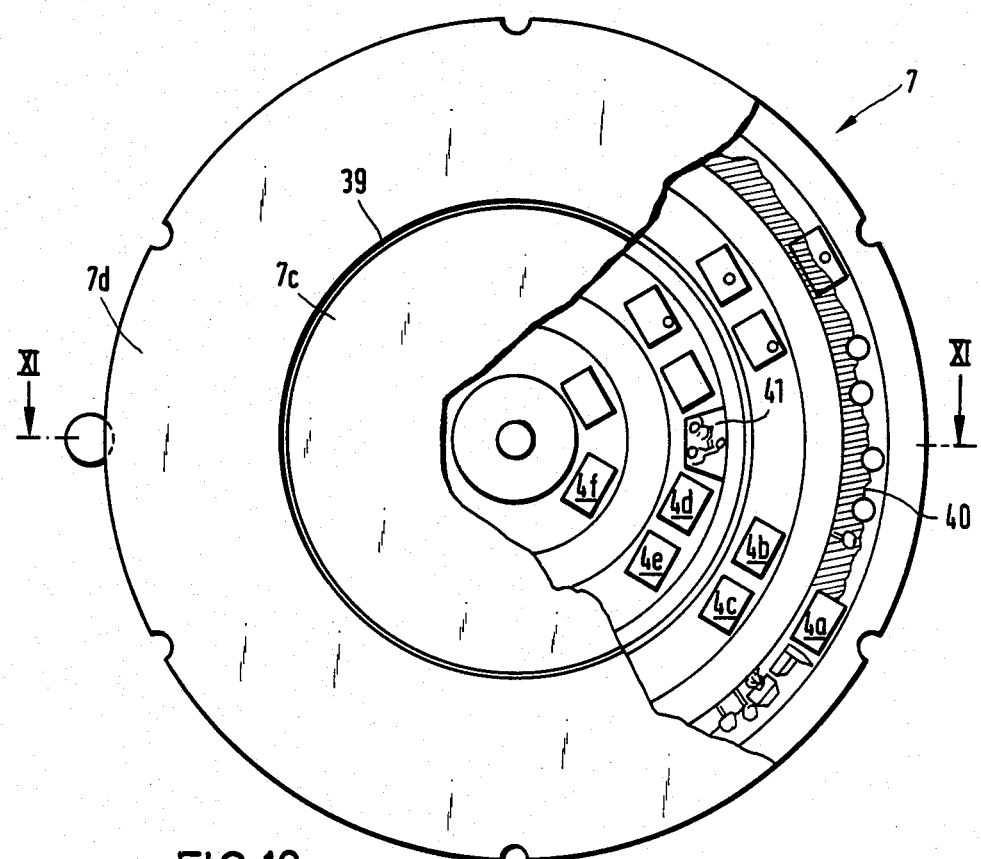

FIG. 10 is a front view of a split slide support of transparent material.

Figure 11:
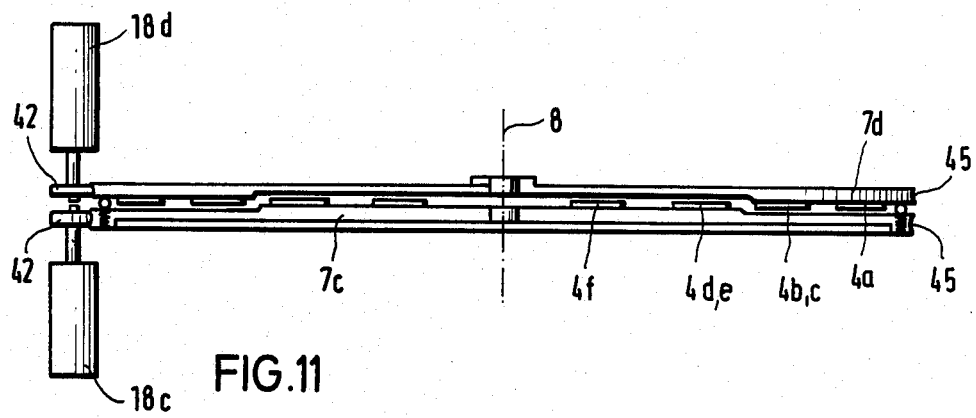

FIG. 11 is a view on the section line XI—XI in FIG. 10.

The projection apparatus to be seen in FIGS. 1 and 2 has a number of objectives 1a, 1b, 1c, 1d, 1e and 1f that are mounted with a short distance therebetween on an objective support 5. As seen in FIG. 2, there are condensors 2 for the objectives 1, such condensors being placed in the same system as the objectives 1a, 1b, 1c, 1d, 1e and 1g in a condensor support 6. The transparencies 4a, 4b, 4c, 4d, 4e and 4f for use with the objectives 1a, 1b, 1c, 1d, 1e, and 1f are placed on a flat transparency support 7, that is designed in the form of a round disk and is supported in the projection apparatus so that it may be turned about a middle shaft 8 in the projection apparatus.

As seen in FIG. 1, there is a group 11 of six transparencies 4a, 4b, 4c, 4d, 4e and 4f placed on each of six sectors of the disk 7. These six groups 11 of transparencies 4 may be put into place in front of the objectives 1a, 1b, 1c, 1d, 1e and 1f by turning the disk 7. The transparencies are kept lined up and in exactly the desired position on the transparency support 7 by way of locking pins. For exact adjustment of the disk-like transparency support in relation to the objective support 5 there are detent cutouts 9 on the outer edge of the disk 7, said detent cutouts functioning with a latch 16 on the projection apparatus. Once the detent latch has dropped into place in a detent cutout 9 a group 11 of transparencies 4 will be exactly lined up between the objectives 1 and the condensors 2 therefor. On the transparency support 7 there are information strips 10, whose information may be read by a reading unit 33. Each group 11 of transparencies 4 has an information strip 10. On turning a group 11 of transparencies 4 into position the signals will be read by the reading unit 33 for controlling the sequence of images, a controller then controlling the switching on and the brightness of the projection lamps 3 in keeping with the information on the information strip 10. The information strips 10 may furthermore have information for the control of sound accompanying the transparencies or the like as well.

Inasfar as the projection apparatus is fitted with a translucent picture screen at a fixed distance, the objectives 1a, 1b, 1c, 1d, 1e and 1f may be fixed on the objective support 5 with the best possible adjustment. Inasfar as the projection apparatus is for the projection of images on a reflecting picture screen, whose distance from the projection apparatus may be changed, the objectives 1a, 1b, 1c, 1d, 1e and 1f will have to be supported in such a way in the objective support 5 that they may be moved axially for focussing. However in order to make it possible as well for all the six images coming from the different objectives to be placed in quite the right relation to each other, the objectives will furthermore have to be able to be adjusted at a right angle to their optic axis. Because not only the axial adjustment but furthermore the sideways adjustment of the objectives is dependent on the distance of the picture screen from the objectives, the same may be adjusted in the objective support along a conical surface so that for example by using a threaded rod all the objectives may be put in focus and moved sideways into the best possible positions therefor.

The objectives 1a, 1b, 1c, 1d, 1e and 1f may however furthermore be guided in exactly machined guide slots in the objective support 5 axially and be guided sideways or radially for adjustment using an adjustment structure 24 designed in the form of a so-called spider 24. The spider 24 makes it possible for the objectives to be moved nearer together or further from each other.

As seen in FIG. 2, there is a special effects disk 12 placed to the back of the transparency support 7 in the form of a disk, said special effects disk 12 being the same in size and design as the disk-like transparency support 7. The special effects disk 12 has pockets 13 therein to take up different standard effects, as for example soft masks, color filters or other patterns. The pockets 13 are placed in the same system and in the same groups as the transparencies 4a, 4b, 4c, 4d, 4e and 4g on the transparency support 7.

In order for the separate transparencies to be lined up and positioned as exactly as possible there are condensors 2 placed to the back of the special effects disk 12, that are kept in place by a condensor support 6. The condensors 2 as well may be so supported that they may be adjusted axially and radially.

To the back of the condensors 2 the projection lamps 3 are placed that are housed in a lamp support 17 in the same system as the objectives 1a to 1f. In the design of FIG. 2 the lamp support 17 is in the form of a disk with a diameter equal to the diameter of the disk-like transparency support 7 and of the special effects disk 12. It is in this way that it is possible for a number of groups of projection lamps to be fixed on the lamp support 17 so if one projection lamp gets out of order the disk-like lamp support 17 may be turned about the shaft 8 and a new group of projection lamps moved into their working position. The switching of the lamp support 17 may furthermore be done by measuring the resistances so that there will be new group of projection lamps ready and moved into the working position before a lamp has burned out. Because this is so the projection apparatus will have a long working life in which it may be run continuously without any trouble. The lamp support 17, designed in the form of a lamp magazine, is bearinged, like the special effects disk 12, on ball bearings on the shaft 8. In the case of a projection apparatus with condensors 2 adjusting sideways, a useful effect is produced if the projection lamps 3 are mounted so that they may be moved sideways in the lamp support 17 as well and then each lamp 3 is able to be positioned exactly on the middle axis of its condensor 2 (see FIG. 4).

As will be clear from FIG. 2, a cooling fan 21 is placed to the back of the lamp support 17 for the purpose of keeping the lamps 3 in the working position cool.

In FIG. 1 the objectives 1a to 1f and the transparencies 4a to 4f projected thereby have their middle points placed on an ellipse. This system gives the useful effect that a relatively large number of groups 11 of transparencies 4 may be positioned on the sectors of one round disk 7. The system does however have the shortcoming that the objectives 1a and 1f have a greater distance between them than the other objectives 1b, 1c, 1d and 1e. To put as many objectives as possible in a limited space a useful effect is produced if the objectives are placed on a circle so that all the objectives have the same distance from a drum axis 22 (see FIG. 7). In this system of positioning the objectives 1 and the condensors 2 the form of the objective support 5 and of the condensor support 6 is simpler. Seeing that with the objectives 1 and the condensors 2 the distances through which the condensors are adjusted is the same for all of them, the design of the adjustment system is made simpler as well.

If more than thirty six transparencies are needed for a program, it is possible for a transparency magazine 25 to be placed on the projection apparatus in place of one round disk-like transparency support 7, such magazine 25 having a large number, as for example twenty, of rectangular transparency supports 7', each of same having six transparencies 4a, 4b, 4c, 4d, 4e and 4f. These transparency supports 7' may, as will be seen in FIG. 6, be dropped into the space 35 between the objectives 1 and the special effects disk 12. The transparency supports 7' are supported so that they may be turned about the guide rod 26 so that one transparency support 7' will be dropped down into the space 35 when the transparency support 7' in question is freed by a rocking latch 27. As is clear from FIG. 5, the transparency supports 7' are mounted in the magazine 25 so that they may be moved axially. The axial adjustment of the disk-like transparency support 7' is caused by a threaded rod 28, that is turned by an electric motor 32. Using this threaded rod 28, that driving is joined with a mating thread 29 on each disk-like transparency support 7', the plates are moved over the space 35 between the objectives 1 and the special effects disk 12. If a transparency support disk 7' is in position exactly over the space 35, the transparency support plate or disk 7' is freed by a rod-like latch 27, that has a break at this point so that the disk 7' is rocked downwards into the right position. With the help of the changeover lever 30 having a roller 31 mounted on the shaft 8, it is possible for the inwardly rocked transparency support disk 7' to be rocked back into the magazine 25 and by further pushing using the threaded rod 28 it may be pushed onto the rocking latch 27.

FIG. 7 is a front view of an objective support 5' with seven objectives 1a to 1g. The axes of these objectives are placed on a circle about the axis of the drum, whereas a seventh objective 1g is placed on the drum axis itself. In the same sort of way the condensors 2 may be placed in the condensor support 6 and the projection lamps 3 may be placed in the lamp support 17. Furthermore the transparencies of one group are to be placed on the transparency support disk 7 or 7' on the same lines.

The separate parts of the projection apparatus, namely the objective support 5, the condensor support 6, the lamp support 17 and the cooling fan 21 are united by a bridge 35 to take the form of a single apparatus. This bridge 35 may be so designed and placed that there is room for the transparency magazine 25 next to the bridge itself or thereon.

The six or seven transparencies 4a to 4f may be projected by the right control of the separate projection lamps one after the other or with different fading effects without mechanical changeover of the transparencies being needed. For this reason new ways of building up audiovisual programs are made possible. The transparency support disks 7 and 7', that are best made of resin, have all the control information as needed for smoothly running a program, even if it is a complex one. The objectives 1a to 1f and the condensors 2 used therewith together with the projection lamps 3 are so placed out of line in relation to the transparencies 4a to 4f that even if the picture screen is placed only a short distance from the objectives or if the projected picture is very large in size, there is no distortion of the perspective and the transparencies are projected so as to be on completely the same area. If the projection distance is changed, all the objectives may be quite exactly adjusted using a common adjustment means.

A projection apparatus in keeping with the invention with a special effects disk 12 and of the light intensity under the control of music may be more specially used in discotheques.

After a sequence of pictures belonging to a transparency group 11 has run to an end, the transparency support 1 has to be turned by its drive 18 through 60° about the shaft 8 so that a new transparency group 11 is swung into the ray path of the six projectors. On turning the transparency carrying disk 7 a blackout phase is produced, as occurs with every projector when the transparency is changed. To avoid having such a blackout phase the design is such, in keeping with the invention, that the round transparency support disk 7 is made up of an inner disk 7a, that carries the transparencies near the shaft 8 of each group, and an outer ring-like disk 7b having the transparencies at a greater distance from the shaft and which may be turned separately from the inner disk about the shaft. With the help of such a transparency support disk it is possible to avoid having a blackout phase by operating in such a way that on turning a part of the transparency support disk the transparencies of the respective other part of the transparency support disk are turned.

FIGS. 8 and 9 show a transparency support disk 7, that is split along the dividing circle 39 into two parts, that is to say an inner disk 7a and an outer, ring-like disk 7b.

As shown in FIG. 9, the two parts of the transparency support disk have their own drives 18a and 18b so that they may be turned separately from each other about the shaft 8. While the inner disk 7a is being moved by way of a centrally placed driving disk 44, the ring-like disk 7b is driven by a friction wheel 42 running on its outer edge and it is supported and guided on guide rollers which also run on its outer edge.

In the working example of the invention to be seen in FIGS. 10 and 11 the support disk 7 is composed of two equally sized disks 7c and 7d that are driven separately from each other and are made of a glass-clear material. The one disk 7c has transparencies 4d, 4e and 4f placed near the shaft of each group 11 and the other disk 7d has the other transparencies 4a, 4b and 4c of each group 11. These two disks 7c and 7d are each driven by a friction wheel 42, that fits into grooves in the edges 45 of the disks 7c and 7d. Because the disks 7c and 7d are made of glass-clear, transparent material, the disk, that is being turned into a new position, does not get in the way of the projection of the transparencies of the other respective disk. In the case of this form of the invention the drives may act on the edges of the two disks or, as a further possibility, on the centers thereof.

A further possible way of avoiding blackout phases on turning the transparency support disk 7 from one position into another, is such that a transparency strip curved around the shaft 8 is used that is more specially placed between the radially outer transparencies 4a of adjacent groups 11 of transparencies. Then on switching over between the transparency support disks 7, this transparency strip 40 will be in the ray path that is otherwise only intended for the transparency 4a of each group 11, so that on turning on the respective projection lamp 3, a moving picture will be seen on the picture screen, as for example a picture of a landscape. If the transparency support disk 7 is made up of two concentric parts, the transparency strip 40 may be faded out by a projected transparency that is located on the inner disk 7c. It is furthermore possible for an intermediate transparency to be placed on the inner disk 7c between the transparency groups 11, such intermediate transparency being projected onto the screen while the projector is being switched over. Because both the drive of the disk 7a or 8c having the radially inner transparency and also the ring-like disk 7b or transparent disk 7d having the radially outer transparency, and furthermore the drive for the special effects disk, and as well the turning on of the projection lamp 3 for each objective are electronically controlled, many different variations in the sequence of the pictures, the fading operations and the like are possible.

| List of Part Numbers | | | |
|---|---|---|---|
| 1a | Objective | 19 | Drive for special effects disk 12 |
| 1b | Objective | | |
| 1c | Objective | 20 | Drive for lamp support 17 |
| 1d | Objective | 21 | Cooling fan |
| 1e | Objective | 22 | Shaft of drum |
| 1e | Objective | 23 | Picture screen |
| 1f | Objective | 24 | Adjustment means |
| 1g | Objective | 25 | Magazine for transparency disks |
| 2 | Condensor | | |
| 3 | Projection lamp | 26 | Guide rod |
| 4a | Transparency | 27 | Rocking latch |
| 4b | Transparency | 28 | Threaded rod |
| 4c | Transparency | 29 | Mating thread |
| 4d | Transparency | 30 | Changeover lever |
| 4e | Transparency | 31 | Roller |
| 4f | Transparency | 32 | Drive for the threaded rod |

-continued

List of Part Numbers

| 5  | Objective support         |     | 28                      |
|----|---------------------------|-----|-------------------------|
| 6  | Condensor support         | 33  | Reading unit            |
| 7  | Transparency support      | 34  | Bridge                  |
|    | disk                      | 35  | Space                   |
| 8  | Shaft                     | 7a  | Inner disk              |
| 9  | Locking means             | 7b  | Ring-like disk          |
| 10 | Information strip         | 7C  | Disk                    |
| 11 | Group of transparencies   | 7d  | Disk                    |
| 12 | Effect disk               | 18a | Drive for inner disk    |
| 12 | Cutouts                   | 18b | Drive for ring-like disk|
| 14 | Group of cutouts 13       | 18c | Drive for disk 7c       |
| 15 | Latch                     | 18d | drive for disk 7d       |
| 16 | Locking means             | 39  | Index circle            |
| 17 | Lamp support              | 40  | Transparency strip      |
| 18 | Drive for transparency    | 42  | Friction roller         |
|    | magazine disk 7           | 43  | Guide roller            |
|    |                           | 44  | Driving disk            |
|    |                           | 45  | Groove                  |

I claim:

1. A projection apparatus for transparencies, comprising at least four projectors each including a projection lamp, a condensor and an objective and arranged to point at the same part of a picture screen, said projectors being offset from one another, said objectives and said condensors having axes which are transversely offset from one another so as to project on the picture screen pictures in register, said projection lamps being adjustable in their brightness independently of one another; a common lamp support arranged to support said projection lamps and being readily replaceable; a flat disc for supporting a plurality of transparencies with offset similar to said projectors, said disc having a central axis and being rotatable about said central axis, said disc being subdivided into a plurality of substantially equal sectors each arranged for supporting a group of at least four transparencies to be associated with said four projectors; an objective support supporting said objectives of said projectors with offset relative to one another; a condensor support supporting said condensors of said projectors with offset which is similar to the offset of said objectives; and an elective drive for driving said disc for supporting the transparencies about said central axis.

2. A projection apparatus as defined in claim 1, wherein said projectors include six such projectors, said disc supporting the transparencies having six such sectors arranged to support six such groups of transparencies to be associated with said six projectors.

3. A projection apparatus as defined in claim 2, wherein said six projectors and the six transparencies are arranged evenly spaced around said central axis.

4. A projection apparatus as defined in claim 3; and further comprising a further projector arranged on said central axis.

5. A projection apparatus as defined in claim 1, wherein said objectives are arranged fixedly on said objective support, said condensors being arranged fixedly on said condensor support; and further comprising a translucent picture screen at a fixed distance from said objective support.

6. A projection apparatus as defined in claim 1, wherein said objectives are adjustable along their optical axes and a right angle thereto.

7. A projection apparatus as defined in claim 6; and further comprising common adjustment means arranged for adjusting said objectives.

8. A projection apparatus as defined in claim 1, wherein said lamp support is formed as a disc having an axis and turnable about its axis, said lamp support having a plurality of sectors and said projection lamps being offset over said sectors to be associated with said objectives and said condensors.

9. A projection apparatus as defined in claim 1; and further comprising a controller for controlling said projection lamps and said drive for said disc for supporting the transparencies.

10. A projection apparatus for transparencies, comprising at least four projectors each including a projection lamp, a condensor and an objective and arranged to point at the same part of a picture screen, said projectors being offset from one another, said objectives and said condensors having axes which are transversely offset from one another so as to project on the picture screen pictures in register, said projection lamps being adjustable in their brightness independently of one another; a flat disc for supporting a plurality of transparencies with offset similar to said projectors, said disc having a central axis and being rotatable about said central axis, said disc being subdivided into a plurality of substantially equal sectors each arranged for supporting a group of at least four transparencies to be associated with said four projectors, said discs having a plurality of information strips each provided in a respective one of said sectors and associated with a respective one of said groups of transparencies, and each storing signals for controlling light sequence; further comprising means for reading the signals stored in said information strips and controlling the light sequence; an objective support supporting said objectives of said projectors with offset relative to one another; a condensor support supporting said condensors of said projectors with offset which is similar to the offset of said objectives; and an elective drive for driving said disc for supporting the transparencies about said central axis.

11. A projection apparatus for transparencies, comprising at least four projectors each including a projection lamp, a condensor and an objective and arranged to point at the same part of a picture screen, said projectors being offset from one another, said objectives and said condensors having axes which are transversely offset from one another so as to project on the picture screen pictures in register, said projection lamps being adjustable in their brightness independently of one another; a flat disc for supporting a plurality of transparencies with offset similar to said projectors, said disc having a central axis and being rotatable about said central axis, said disc being subdivided into a plurality of substantially equal sectors each arranged for supporting a group of at least four transparencies to be associated with said four projectors; an objective support supporting said objectives of said projectors with offset relative to one another; a condensor support supporting said condensors of said projectors with offset which is similar to the offset of said objectives; an elective drive for driving said disc for supporting the transparencies about said central axis; a shaft on which said disc for supporting the transparencies is arranged; and a changeover lever fixed on said shaft and arranged for replacing said disc for supporting the transparencies.

12. A projection apparatus for transparencies, comprising at least four projectors each including a projection lamp, a condensor and an objective and arranged to point at the same part of a picture screen, said projectors being offset from one another, said objectives and said condensors having axes which are transversely